United States Patent
Jiang et al.

(10) Patent No.: US 9,835,886 B2
(45) Date of Patent: *Dec. 5, 2017

(54) LIQUID CRYSTAL DISPLAY WITH SWITCHABLE VIEWING ANGLE AND METHOD OF VIEWING ANGLE CONTROL

(71) Applicant: Infovision Optoelectronics (Kunshan) Co., Ltd., Kunshan, Jiangsu Province (CN)

(72) Inventors: Limei Jiang, Kunshan (CN); Xuemei Jiang, Kunshan (CN); Tingting Wu, Kunshan (CN); Rui Liu, Kunshan (CN)

(73) Assignee: INFOVISION OPTOELECTRONICS (KUNSHAN) CO., LTD., Kunshan, Jiangsu Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/216,689

(22) Filed: Jul. 21, 2016

(65) Prior Publication Data

US 2017/0192263 A1   Jul. 6, 2017

(30) Foreign Application Priority Data

Dec. 31, 2015 (CN) .......................... 2015 1 1027937

(51) Int. Cl.
*G02F 1/1343* (2006.01)
*G02F 1/13* (2006.01)

(52) U.S. Cl.
CPC ...................... *G02F 1/1323* (2013.01); *G02F 2001/134372* (2013.01); *G02F 2001/134381* (2013.01)

(58) Field of Classification Search
CPC ........... G02F 1/13306; G02F 1/133345; G02F 1/133528; G02F 1/133784;
(Continued)

(56) References Cited

U.S. PATENT DOCUMENTS

2014/0002761 A1   1/2014  Heo et al.
2015/0022768 A1*  1/2015  Li ..................... G02F 1/134309
                                                          349/108
2016/0341987 A1* 11/2016  Chung .................. G02F 1/1323

FOREIGN PATENT DOCUMENTS

CN    104155808 A    11/2014
CN    104865757 A     8/2015
(Continued)

*Primary Examiner* — James Dudek
(74) *Attorney, Agent, or Firm* — Cheng-Ju Chiang (57) ABSTRACT

An LCD includes a first substrate, a second substrate, and a liquid crystal layer. The first substrate is provided with a first electrode. The first electrode is provided with a plurality of first elongated electrodes. The second substrate is provided with a second electrode and a third electrode. The second electrode is a common electrode and the third electrode is a pixel electrode. The second electrode is provided with a plurality of second elongated electrodes. The first elongated electrodes and the second elongated electrodes are arranged alternately, and the first elongated electrodes have no overlap with the second elongated electrodes. When no bias voltage is applied between the first electrode and the second electrode, the LCD is displayed with a wide viewing angle; and when a bias voltage is applied between the first electrode and the second electrode, the LCD is displayed with a narrow viewing angle.

18 Claims, 11 Drawing Sheets

(58) Field of Classification Search
CPC ........... G02F 1/133788; G02F 1/13439; G02F 1/1368; G02F 1/137; G02F 1/133514; G02F 1/1339; G02F 1/136286
See application file for complete search history.

(56) References Cited

FOREIGN PATENT DOCUMENTS

| | | |
|---|---|---|
| CN | 105068337 A | 11/2015 |
| CN | 105223743 A | 1/2016 |
| CN | 105372883 A | 3/2016 |
| CN | 105446014 A | 3/2016 |
| TW | 201329526 A1 | 7/2013 |

* cited by examiner

LIQUID CRYSTAL DISPLAY WITH SWITCHABLE VIEWING ANGLE AND METHOD OF VIEWING ANGLE CONTROL

CROSS-REFERENCE TO RELATED APPLICATION

The present application is based on and claims priority of Chinese patent application No. 201511027937.9, filed on Dec. 31, 2015. The entire disclosure of the above-identified application is hereby incorporated by reference herein and made a part of this specification.

TECHNICAL FIELD

The present application relates to liquid crystal display technology, and more particularly to a liquid crystal display (LCD) with switchable viewing angle and a viewing angle control method of the LCD.

BACKGROUND

Liquid crystal display (LCD) has many advantages, such as, light weight, energy saving, no radiation, and accordingly has gradually replaced traditional cathode ray tube (CRT) display. LCDs are widely used in high-definition digital televisions, desktop computers, personal digital assistants (PDA), notebook computers, mobile phones, digital cameras, and other electronic devices.

Wide viewing angle is the mainstream development of an LCD. Presently, portable electronic devices such as notebook computers, personal digital assistants, tablet PCs, mobile phones are adopted with wide viewing angle technology, so that users can see the display images on the LCD without distortion when viewed from different viewing angles. However, when using the portable electronic device in public places, the wide viewing angle design of conventional LCD cannot effectively protect the privacy of the user, and the images displayed on the LCD can be easily viewed by a bystander in a squint direction. Therefore, in addition to the needs for a wide viewing angle, LCDs capable of being adjusted to a narrow viewing angle are thus developed in order to protect modern people's needs of privacy in public places.

Currently, there are mainly two ways to switch between a wide viewing angle and a narrow viewing angle in an LCD. One way is to use a louver shielding film to cover the screen so as to reduce the angle of view in the need for protecting privacy. However, this way needs preparation of an additional louver covering film, causing great inconvenience to the user. One louver covering film can only achieve a fixed viewing angle. Once a louver covering film is attached to the screen, then the viewing angle of the screen is fixed and cannot change according to requirement of the user. The other way is to provide a dual light source backlight system in the LCD to adjust the angle of view. The dual light source backlight system consists of two layers of laminated light guide plates in combination with an anti-prism lens, the top light guide plate (LGP-T) combined with the anti-prism lens is used to change the direction of lights and restrict the lights in a relatively narrow range to obtain a narrow viewing angle in the LCD, while the bottom light guide plate (LGP-B) combined with the function of the anti-prism lens is used to obtain a wide viewing angle in the LCD. However, the dual light source backlight system will cause the thickness and the cost of the LCD to increase remarkably, which is not in line with the development trend of light weight, compactness and slimness of the LCD.

SUMMARY

The present application provides an LCD with switchable viewing angle. The LCD can switch between a wide viewing angle and a narrow viewing angle, without the need to use a louver shielding film or to provide a dual light source backlight system in the LCD, and without increasing the thickness and the cost of the LCD.

In one aspect, the present application provides an LCD with switchable viewing angle. The LCD includes a first substrate, a second substrate, and a liquid crystal layer sealed between the first substrate and the second substrate. The first substrate is provided with a first electrode thereon. The first electrode is provided with a plurality of first elongated electrodes for controlling the viewing angle of the LCD. The second substrate is provided with a second electrode and a third electrode thereon. The second electrode is a common electrode for inputting a common voltage to the LCD. The third electrode is a pixel electrode formed in the sub-pixel areas of the LCD. The second electrode is provided with a plurality of second elongated electrodes. The first elongated electrodes and the second elongated electrodes are arranged alternately, and the first elongated electrodes have no overlap with the second elongated electrodes. Further, the liquid crystal layer is provided with a plurality of negative liquid crystal molecules.

By applying a bias voltage between the first electrode and the second electrode, the viewing angle of the LCD can be controlled. When no bias voltage is applied between the first electrode and the second electrode, the LCD achieves a wide viewing angle display mode as current FFS type LCDs or IPS type LCDs. When a bias voltage is applied between the first electrode and the second electrode, an inclined electric field is generated between the first elongated electrodes and the second elongated electrodes. The liquid crystal molecules in the liquid crystal layer rotate under the inclined electric field to result a light leakage phenomenon, such that the contrast of brightness of the LCD between the bright state and the dark state is decreased, and the viewing angle of the LCD is correspondingly reduced, to thereby achieve a narrow viewing angle display mode.

In another aspect, the present application provides a control method of controlling the viewing angle of the LCD. The control method includes the steps: when the LCD is required to display with a wide viewing angle, applying no bias voltage between the first electrode and the second electrode; and when the LCD is required to display with a narrow viewing angle, applying a bias voltage between the first electrode and the second electrode. The bias voltage applied between the first electrode and the second electrode may be in the range of 4V to 7V.

Therefore, by simply applying a bias voltage between the first electrode and the second electrode, the viewing angle of the LCD can be controlled. Thus, the LCD can switch between a wide viewing angle display mode and a narrow viewing angle display mode to meet the requirements for protecting privacy in public places. It is not required to use a louver shielding film or to provide a dual light source backlight system in LCD, without increasing the thickness and the cost of the LCD and having the advantages of easy operation and good flexibility.

Other novel features and advantages will become more apparent from the following detailed description when taken in conjunction with the accompanying drawings.

DETAILED DESCRIPTION OF PREFERRED EMBODIMENTS

Exemplary embodiments of the present application are described in detail with reference to the accompanying drawings, but the present application is not limited to the following embodiments.

Figure 1:
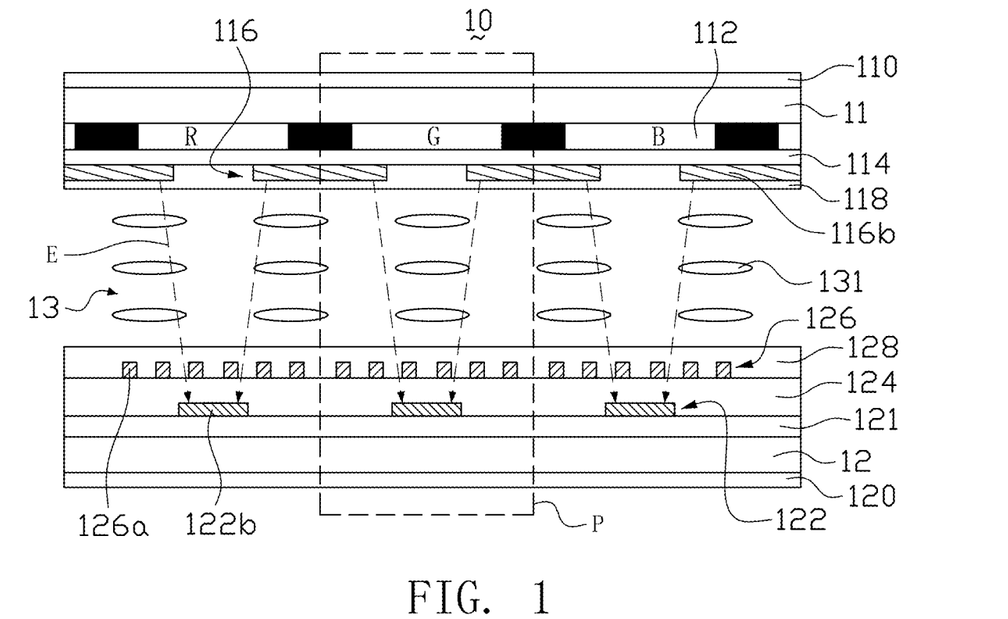
FIG. 1 schematically shows a cross-sectional view of an LCD according to a first embodiment of the present application.

FIG. 1 schematically shows a cross-sectional view of an LCD according to a first embodiment of the present application. In order for clarity, only a portion of the LCD is shown. Referring to FIG. 1, the present application provides a liquid crystal display (LCD) 10 with switchable viewing angle. The LCD 10 includes a first substrate 11, a second substrate 12 disposed opposite to the first substrate 11, and a liquid crystal layer 13 disposed and sealed between the first substrate 11 and the second substrate 12.

Generally, when a user views an LCD from different viewing angles, the brightness of images may reduce as the viewing angle increases. For traditional twisted nematic (TN) type LCD, common electrode and pixel electrode are separately formed on two different substrates, the liquid crystal molecules rotate in a plane orthogonal to the substrates. However, a viewing angle of TN type LCD is narrow as the orientations of liquid crystal molecules adjacent to the surfaces of the two substrates are orthogonal with each other. In order to realize wide viewing angle, both in-plane switch (IPS) type LCD employing a horizontal electric field and fringe field switching (FFS) type LCD employing a fringe electric field have been developed. For IPS type LCD or FFS type LCD, common electrode and pixel electrode are formed on the same substrate (e.g., the TFT array substrate), the liquid crystal molecules are rotated in a plane substantially in parallel to the substrate to obtain enlarged viewing angle.

The LCD 10 of the present application is suitable for application in FFS type LCD or IPS type LCD in which the liquid crystal molecules rotate in a plane in parallel to the substrates. In FIG. 1, the LCD 10 is shown as an FFS type LCD by an example. However, in other embodiment, the LCD 10 can also be an IPS type LCD.

The first substrate 11 may be a color filter substrate, the second substrate 12 may be a thin film transistor (TFT) array substrate. A first polarizer 110 is arranged on an outer surface of the first substrate 11 far away from the liquid crystal layer 13. A second polarizer 120 is arranged on an outer surface of the second substrate 12 far away from the liquid crystal layer 13. The first polarizer 110 has a light transmission axis which is orthogonal to a light transmission axis of the second polarizer 120.

Specifically, there are provided with a color filter layer 112, an overcoat layer 114, a first electrode 116, and a first alignment film 118 on an inner surface of the first substrate 11 facing the liquid crystal layer 13. In the embodiment, the color filter layer 112, the overcoat layer 114, the first electrode 116 and the first alignment film 118 are arranged sequentially from the inner surface of the first substrate 11 towards the liquid crystal layer 13, but not limited thereto. In other embodiment, the overcoat layer 114 and the first electrode 116 may be changed in order, that is, the color filter layer 112, the first electrode 116, the overcoat layer 114 and the first alignment film 118 are arranged sequentially from the inner surface of the first substrate 11 towards the liquid crystal layer 13.

The color filter layer 112 may include red (R) color filters, green (G) color filters, and blue (B) color filters, wherein the red (R) color filters, the green (G) color filters and the blue (B) color filters correspond respectively to red (R) sub-pixels, green (G) sub-pixels and blue (B) sub-pixels of the LCD 10. Further, a black matrix (not labeled) is provided between the red (R) color filters, the green (G) color filters and the blue (B) color filters, and the black matrix covers at a peripheral area of each sub-pixel of the LCD 10. The overcoat layer 114 is used mainly for making an inner side of the first substrate 11 to be smooth and planar. The first electrode 116 is used for controlling a viewing angle of the LCD 10. The first alignment film 118 is located near the liquid crystal layer 13.

Specifically, there are provided with a gate insulating layer 121, a second electrode 122, an insulating layer 124, a third electrode 126, and a second alignment film 128 on an inner surface of the second substrate 12 facing the liquid crystal layer 13. In the embodiment, the gate insulating layer 121, the second electrode 122, the insulating layer 124, the third electrode 126 and the second alignment film 128 are arranged sequentially from the inner surface of the second substrate 12 towards the liquid crystal layer 13, but not limited thereto. The second electrode 122 and the third electrode 126 are insulated from each other by the insulating layer 124 disposed between the second electrode 122 and the third electrode 126.

The second electrode 122 is a common electrode used for inputting a common voltage (i.e., Vcom) from an IC (not shown) to the LCD 10, while the third electrode 126 is a pixel electrode which is formed in the sub-pixel areas P of the LCD 10. In the embodiment, the third electrode 126 is disposed above the second electrode 122, but not limited thereto. For example, in another embodiment not specifically shown, the third electrode 126 may be disposed below the second electrode 122. The second alignment film 128 is located near the liquid crystal layer 13.

The first electrode 116, the second electrode 122 and the third electrode 126 are preferred to be transparent, and may be made of Indium Tin Oxide (ITO), Indium Zinc Oxide (IZO) and so on.

Figure 2:
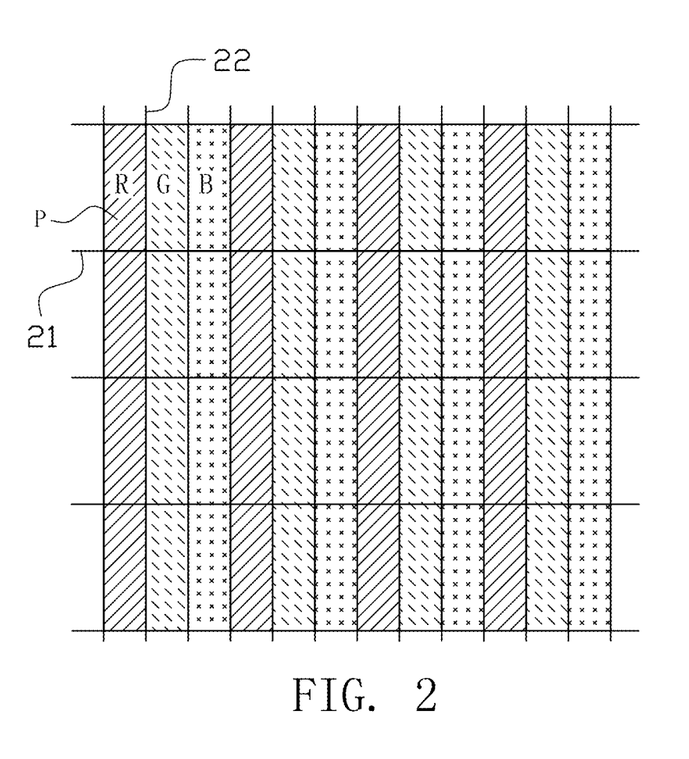
FIG. 2 schematically shows the pixel array of the LCD of FIG. 1.

FIG. 2 schematically shows the pixel array of the LCD 10 of FIG. 1. Referring to FIGS. 1-2, the LCD 10 may further include a plurality of scanning lines 21, a plurality of data lines 22 and a plurality of TFTs (not shown) formed on the second substrate 12. The scanning lines 21 and the data lines 22 are intersected with each other to define a plurality of sub-pixel areas P. In each sub-pixel area P, a sub-pixel is formed which may be a red (R) sub-pixel, a green (G) sub-pixel, or a blue (B) sub-pixel. The sub-pixels are arranged in rows and columns to form a matrix. In each sub-pixel area P, a pixel electrode (i.e., the third electrode 126) and a TFT are provided therein. The TFT has a gate electrode electrically connected with a corresponding scanning line 21, a source electrode electrically connected with a corresponding data line 22, and a drain electrode electrically connected with the pixel electrode, as is well known.

In FIG. 2, each sub-pixel formed in the sub-pixel area P extends along a direction in which the data lines 22 extend, that is, each sub-pixel has a length direction along the data lines 22. Along a direction in which the scanning lines 21 extend, multiple neighboring sub-pixels form a pixel. For example, each pixel may include a red (R) sub-pixel, a green (G) sub-pixel, and a blue (B) sub-pixel.

Figure 3:
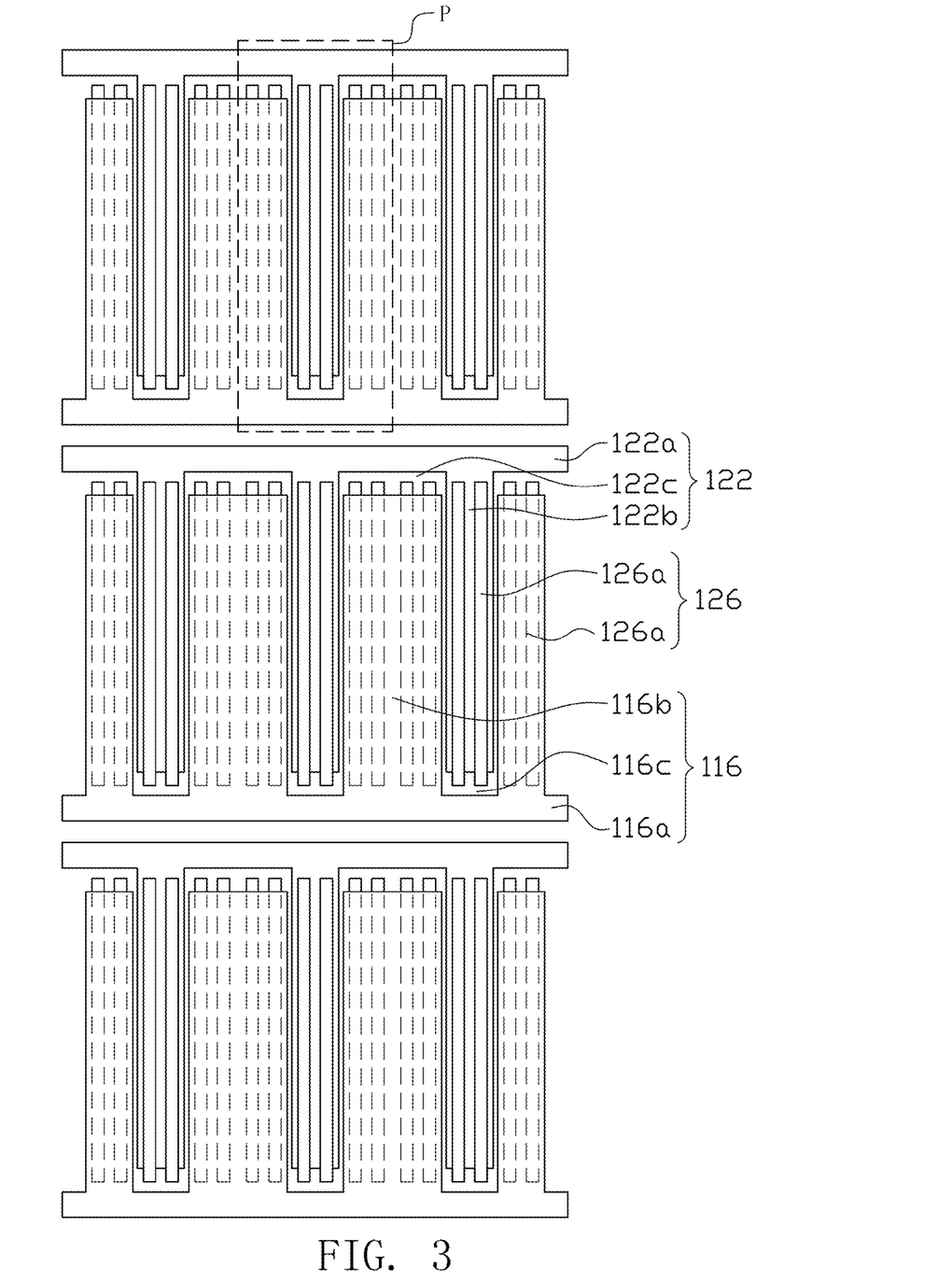
FIG. 3 schematically shows a plan view of the first electrode, the second electrode and the third electrode in multiple sub-pixel areas of the LCD of FIG. 1.
Figure 4:
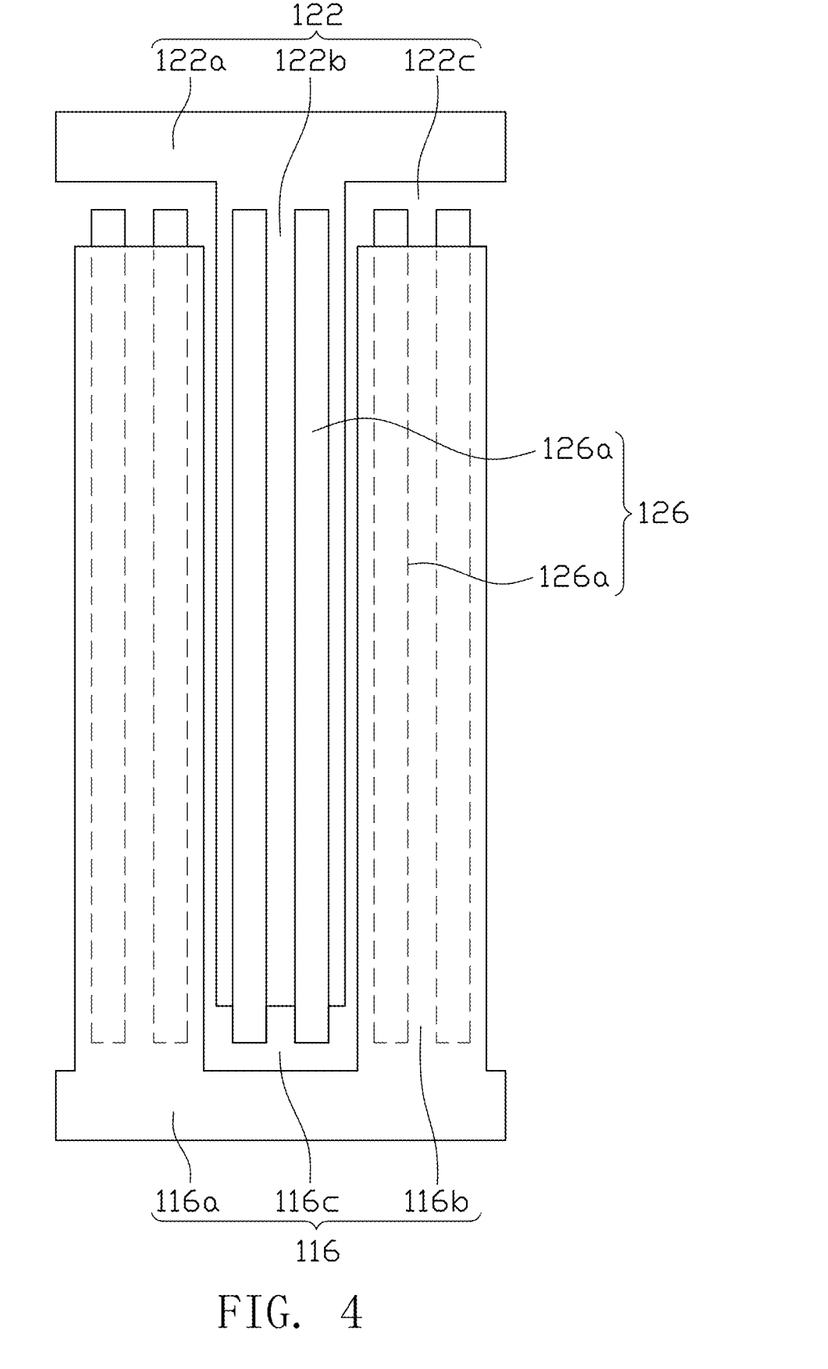
FIG. 4 schematically shows a plan view of the first electrode, the second electrode and the third electrode in a sub-pixel area of the LCD of FIG. 1.

FIG. 3 schematically shows a plan view of the first electrode, the second electrode and the third electrode in multiple sub-pixel areas of the LCD of FIG. 1. FIG. 4 schematically shows a plan view of the first electrode, the second electrode and the third electrode in a sub-pixel area of the LCD of FIG. 1. Referring simultaneously to FIGS. 3-4, the first electrode 116 includes a first connecting line 116a and a plurality of first elongated electrodes 116b extending from the first connecting line 116a. The second electrode 122 includes a second connecting line 122a and a plurality of second elongated electrodes 122b extending from the second connecting line 122a. The first elongated electrodes 116b are parallel to the second elongated electrodes 122b. The first elongated electrodes 116b and the second elongated electrodes 122b are arranged alternately, and the first elongated electrodes 116b have no overlap with the second elongated electrodes 122b.

Further, the second elongated electrodes 122b are formed at a central portion of each sub-pixel area P, and the first elongated electrodes 116b are formed at two opposite sides of each second elongated electrode 122b. In the embodiment, the first elongated electrodes 116b are formed at left and right sides of each second elongated electrode 122b.

In the embodiment, the first connecting line 116a and the second connecting line 122a extend along the direction of the scanning lines 21 and are spaced from each other, wherein the first connecting line 116a and the second connecting line 122a are located respectively at lower and upper sides of each row of sub-pixels. The first elongated electrodes 116b extend perpendicularly from the first connecting line 116a towards the second connecting line 122a, and the second elongated electrodes 122b extend perpendicularly from the second connecting line 122a towards the first connecting line 116a. A first elongated gap 116c is formed between every two neighboring first elongated electrodes 116b, and the second elongated electrodes 122b are disposed corresponding to the first elongated gaps 116c. A second elongated gap 122c is formed between every two neighboring second elongated electrodes 122b, and the first elongated electrodes 116b are disposed corresponding to the second elongated gaps 122c.

The first connecting lines 116a of the first electrode 116 may be electrically connected together at a peripheral area (i.e., non-active area) of the LCD 10, such that a bias voltage used for controlling the viewing angle of the LCD 10 can be applied to the first electrode 116 from the peripheral area.

Similarly, the second connecting lines 122a of the second electrode 122 may be electrically connected together at the peripheral area of the LCD 10, such that a common voltage (i.e., Vcom) can be inputted into the second electrode 122 (i.e., the common electrode) from the peripheral area.

It should be noted that, at the peripheral area, the first substrate 11 and the second substrate 12 may be connected together via an electrically conductive material such as gold balls, such that the bias voltage applied to the first electrode 116 of the first substrate 11 can be inputted from a printed circuit board (PCB) which is connected to the second substrate 12.

The third electrode 126 provided in each sub-pixel area P of the LCD 10 is a pixel electrode used for receiving data signals from a source driver IC for display. The third electrode 126 in each sub-pixel area P includes a plurality of third elongated electrodes 126a which are arranged in parallel to each other. It should be noted that, although it is not shown, the third elongated electrodes 126a in each sub-pixel area P should be connected together so as to electrically connect to the drain electrode of a TFT located in the sub-pixel area P. The third elongated electrodes 126a are extended in parallel with the first elongated electrodes 116b and the second elongated electrodes 122b. The first elongated electrodes 116b, the second elongated electrodes 122b and the third elongated electrodes 126a extend along the direction of the data lines 22. The third elongated electrodes 126a have a line width smaller than the first elongated electrodes 116b and the second elongated electrodes 122b, such that the third elongated electrodes 126a in each sub-pixel area P are overlapped with the first elongated electrodes 116b and the second elongated electrodes 122b along the thickness direction of the LCD 10.

As particularly shown in FIG. 4, in each sub-pixel area P, a portion of the third elongated electrodes 126a are overlapped with the second elongated electrode 122b, and another portion of the third elongated electrodes 126a are overlapped with the first elongated electrodes 116b.

As shown in the embodiment, in each sub-pixel area P, a portion of the third elongated electrodes 126a are located above and overlapped with the second elongated electrode 122b which is provided at the central portion of the sub-pixel area P, the other portion of the third elongated electrodes 126a are located below and overlapped with the first elongated electrodes 116b which are disposed at left and right sides of the second elongated electrode 122b.

In the embodiment, the third elongated electrodes 126a overlapped with the second elongated electrode 122b accounts for one third of the total number of the third elongated electrodes 126a, the third elongated electrodes 126a overlapped with the first elongated electrodes 116b accounts for two thirds of the total number of the third elongated electrodes 126a, but not limited thereto.

The liquid crystal layer 13 is provided with a plurality of liquid crystal molecules 131 which are sealed between the first alignment film 118 and the second alignment film 128.

The first alignment film 118 and the second alignment film 128 may be made of polyimide (PI). The first alignment film 118 and the second alignment film 128 are used to align the liquid crystal molecules 131, so that the liquid crystal molecules 131 are oriented in predetermined directions. Each of the alignment films 118, 128 may be subjected to a rubbing treatment according to publicly known rubbing process. After the rubbing process, the first alignment film 118 is rubbed to have a first rubbing direction, the second alignment film 128 is rubbed to have a second rubbing direction. The liquid crystal molecules 131 adjacent to the first alignment film 118 are arranged and oriented along the first rubbing direction of the first alignment film 118, while the liquid crystal molecules 131 adjacent to the second alignment film 128 are arranged and oriented along the second rubbing direction of the second alignment film 128. The first rubbing direction and the second rubbing direction may be parallel to or crossed to form an angle with each other.

Liquid crystal molecules are generally divided into positive liquid crystal molecules and negative liquid crystal molecules. In the application, the liquid crystal molecules 131 in the liquid crystal layer 13 are negative liquid crystal molecules. Since the negative liquid crystal molecules 131 will rotate to a direction perpendicular to the electric field, when a fringe electric field is provided between the second electrode 122 and the third electrode 126, the negative liquid crystal molecules 131 in the liquid crystal layer 13 rotate in a plane in parallel to the substrates 11, 12, until the long axis of the negative liquid crystal molecules 131 are perpendicular to the fringe electric field, so that the LCD 10 has better light transmission.

In the initial state, the negative liquid crystal molecules 131 are initially arranged in parallel to the principal surfaces of the substrates 11, 12, that is, the long axis of the negative liquid crystal molecules 131 are parallel to the principal surfaces of the substrates 11, 12. Since the alignment films 118, 128 have an anchoring effect to the liquid crystal molecules 131, the liquid crystal molecules 131 are arranged between the alignment films 118, 128 in parallel to the substrates 11, 12 under the anchoring effect. In practical applications, the liquid crystal molecules 131 adjacent to the alignment films 118, 128 may also be tilted at a small pretilt angle which may be in the range of 0° to 5°.

The LCD 10 can switch between a wide viewing angle and a narrow viewing angle. When no bias voltage is applied between the first electrode 116 and the second electrode 122, the negative liquid crystal molecules 131 in the liquid crystal layer 13 rotate in a plane parallel to the principal surfaces of the substrates 11, 12 under the fringe electric field generated between the second electrode 122 (i.e., the common electrode) and the third electrode 126 (i.e., the pixel electrode), such that the LCD 10 achieves a wide viewing angle display mode as current FFS type LCDs or IPS type LCDs. In the present application, "no bias voltage" also includes the situations in which a bias voltage smaller than a specific value such as 0.5V is applied between the first electrode 116 and the second electrode 122.

Figure 5:
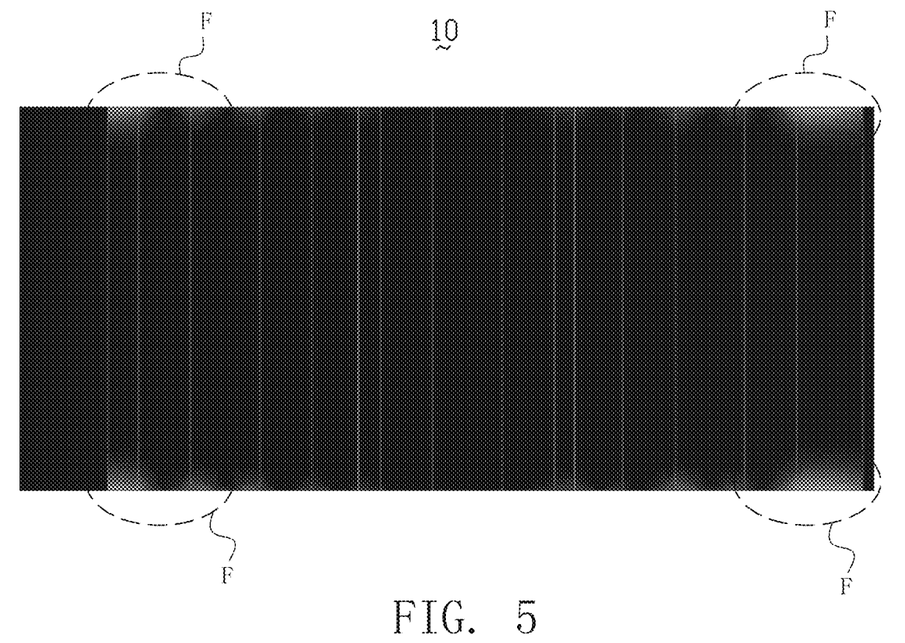
FIG. 5 shows the display effect of the LCD of FIG. 1 when it is displayed in the dark state with a bias voltage applied between the first electrode and the second electrode.

When a bias voltage (e.g., 4V~7V) is applied between the first electrode 116 and the second electrode 122, an inclined electric field E (as denoted by dashed line with arrow in FIG. 1) is generated between the first elongated electrodes 116a of the first electrode 116 and the second elongated electrodes 122b of the second electrode 122. For example, if the potential of the first electrode 116 is 5V and the potential of the second electrode 122 is 0V, then a bias voltage of 5V is applied between the first electrode 116 and the second electrode 122. The fringe electric field, which is generated between the second electrode 122 and the third electrode 126 for driving the liquid crystal molecules 131 to rotate in a plane parallel to the principal surfaces of the substrates 11, 12, is weakened due to the existence of the inclined electric field E. Further, the negative liquid crystal molecules 131 in the liquid crystal layer 13 will rotate under the inclined electric field E to a direction perpendicular to the inclined electric field E. As the liquid crystal molecules 131 rotate under the inclined electric field E, the tilt angle of the liquid crystal molecules 131 relative to the substrates 11, 12 is increased. As a result, a light leakage phenomenon is resulted when the LCD 10 is displayed in the dark state. FIG. 5 shows the display effect of the LCD of FIG. 1 when it is displayed in the dark state with a bias voltage applied between the first electrode 116 and the second electrode 122. It can be seen from FIG. 5, there is a light leakage at areas as shown in the dashed frames F. Due to the light leakage, the contrast of brightness of the LCD 10 between the bright state and the dark state is decreased, and the viewing angle of the LCD 10 is correspondingly reduced, to thereby achieve a narrow viewing angle display mode.

It is well known that the viewing angle of an LCD is mainly affected by the contrast of brightness between the bright state and the dark state of the LCD. When a bias voltage is applied between the first electrode 116 and the second electrode 122, a light leakage is resulted due to the inclined electric field E generated between the first elongated electrodes 116a of the first electrode 116 and the second elongated electrodes 122b of the second electrode 122. Thus, the contrast of brightness of the LCD 10 between the bright state and the dark state is decreased, and the viewing angle of the LCD 10 is reduced. Thus, the LCD 10 can achieve a narrow viewing angle display mode.

Further, by controlling the magnitude of the bias voltage applied between the first electrode 116 and the second electrode 122, the viewing angle of the LCD 10 can be regulated. In the narrow viewing angle display mode, the bias voltage applied between the first electrode 116 and the second electrode 122 is preferably in the range of 4V to 7V. When no bias voltage is applied between the first electrode 116 and the second electrode 122, the LCD 10 is displayed with a wide viewing angle. When a bias voltage in the range of 4V~7V is applied between the first electrode 116 and the second electrode 122, the LCD 10 is displayed with a relatively narrow viewing angle, so as to meet the requirements for protecting privacy in public places.

Figure 6:
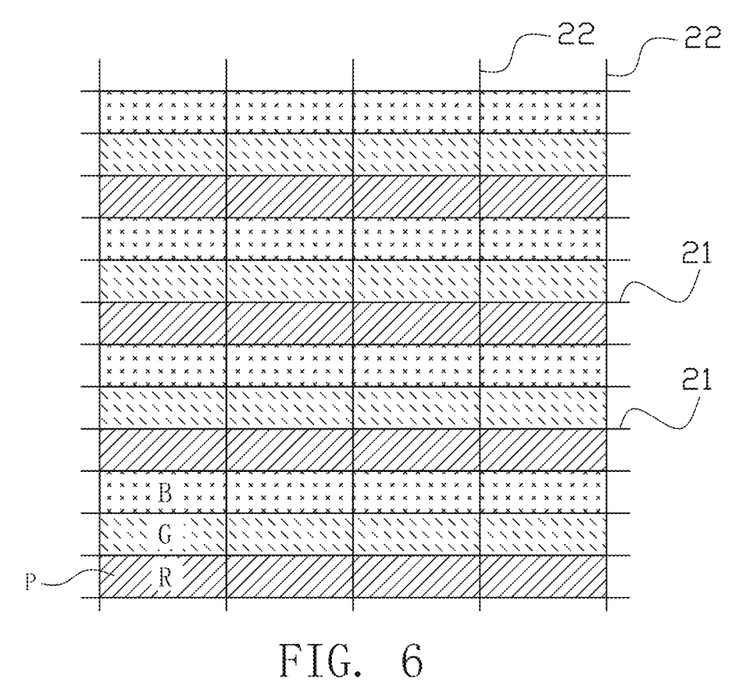
FIG. 6 schematically shows the pixel array of an LCD according to a second embodiment of the present application.
Figure 7:
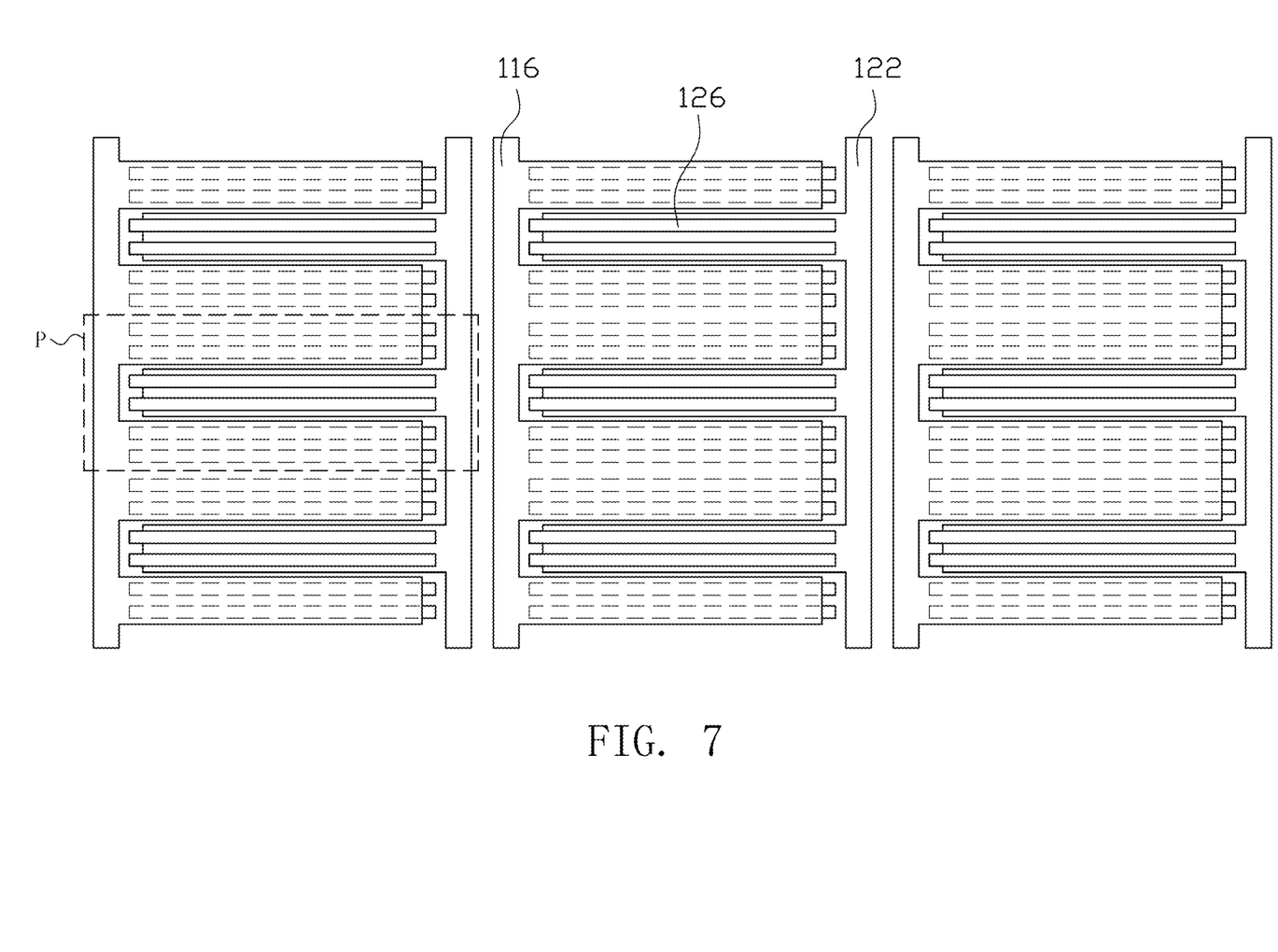
FIG. 7 schematically shows a plan view of the first electrode, the second electrode and the third electrode in multiple sub-pixel areas of the LCD of FIG. 6.

FIG. 6 schematically shows the pixel array of an LCD according to a second embodiment of the present application. FIG. 7 schematically shows a plan view of the first electrode, the second electrode and the third electrode in multiple sub-pixel areas of the LCD of FIG. 6. Referring to FIGS. 6-7, each sub-pixel formed in the sub-pixel area P extends along a direction in which the scanning lines 21 extend, that is, each sub-pixel has a length direction along the scanning lines 21. Along a direction in which the data lines 22 extend, multiple neighboring sub-pixels form a pixel. For example, each pixel may include a red (R) sub-pixel, a green (G) sub-pixel, and a blue (B) sub-pixel.

In the second embodiment, the first connecting line 116a and the second connecting line 122a extend along the direction of the data lines 22. The first connecting line 116a and the second connecting line 122a are located respectively at left and right sides of each column of sub-pixels. The first elongated electrodes 116b, the second elongated electrodes 122b and the third elongated electrodes 126a extend along the direction of the scanning lines 21.

In the above-mentioned embodiments, the first elongated electrodes 116b of the first electrode 116 and the second elongated electrodes 122b of the second electrode 122 are arranged alternately, and the first elongated electrodes 116b have no overlap with the second elongated electrodes 122b. Further, the second elongated electrodes 122b are formed at a central portion of each sub-pixel area P. In the first embodiment shown in FIG. 3, the second elongated electrodes 122b extend along the direction of the data lines 22, and the first elongated electrodes 116b are formed at left and right sides of each second elongated electrode 122b, while in the second embodiment shown in FIG. 7, the second elongated electrodes 122b extend along the direction of the scanning lines 21, and the first elongated electrodes 116b are formed at lower and upper sides of each second elongated electrode 122b. When a bias voltage is applied between the first electrode 116 and the second electrode 122, an inclined electric field E is generated between the first elongated electrodes 116a of the first electrode 116 and the second elongated electrodes 122a of the second electrode 122, the liquid crystal molecules 131 in the liquid crystal layer 13 rotate under the inclined electric field E to result a light leakage, whereby the contrast of brightness of the LCD 10 between the bright state and the dark state is decreased and the viewing angle of the LCD 10 is reduced, such that the LCD 10 can achieve a narrow viewing angle.

Figure 8:
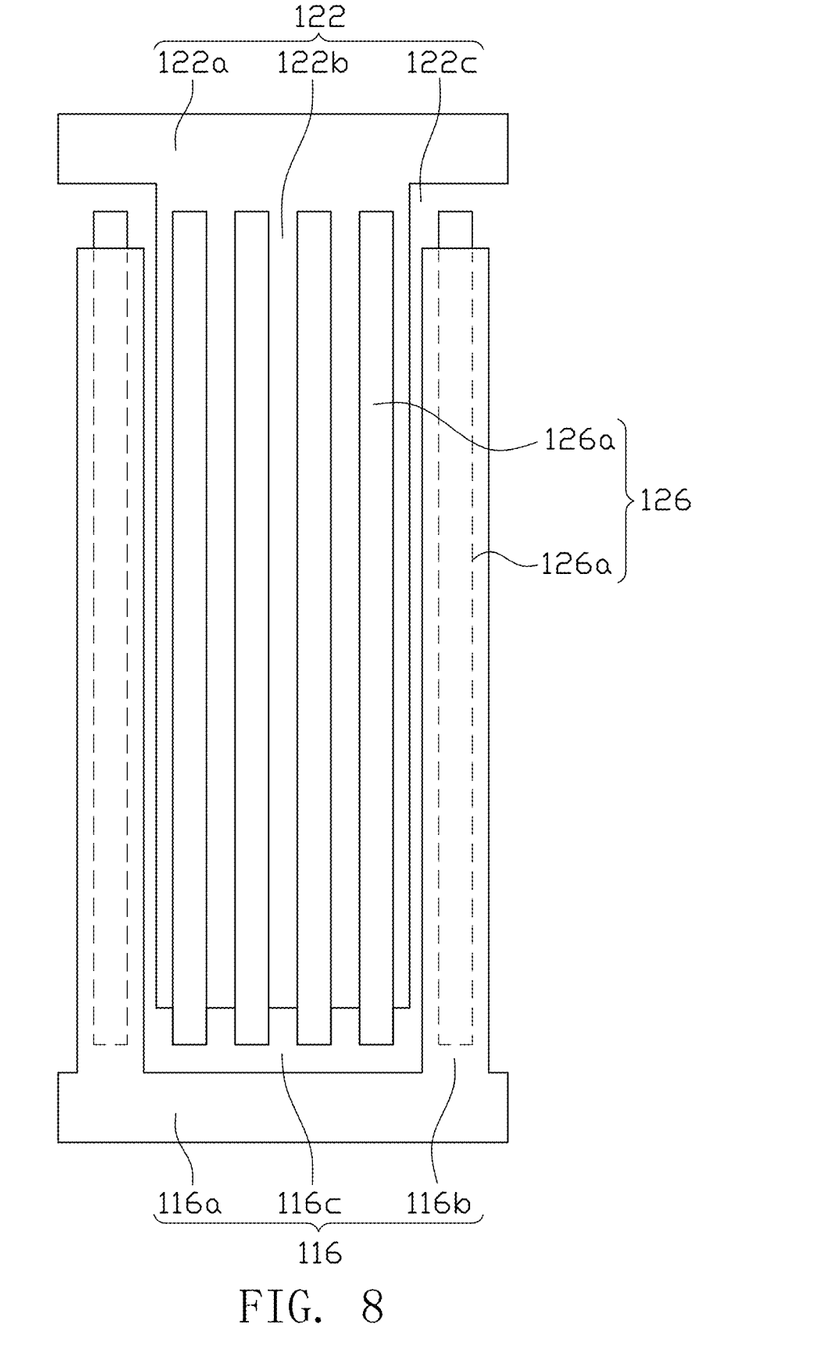
FIG. 8 schematically shows a plan view of the first electrode, the second electrode and the third electrode in a sub-pixel area of an LCD according to a third embodiment of the present application.

FIG. 8 schematically shows a plan view of the first electrode, the second electrode and the third electrode in a sub-pixel area of an LCD according to a third embodiment of the present application. As shown in FIG. 8, in the third embodiment, a width of the second elongated electrode 122b is enlarged relative to the embodiment shown in FIG. 4, such that the third elongated electrodes 126a overlapped with the second elongated electrode 122b accounts for two thirds of the total number of the third elongated electrodes 126a, and the third elongated electrodes 126a disposed at two opposite sides of the second elongated electrode 122b and overlapped with the first elongated electrodes 116b accounts for one third of the total number of the third elongated electrodes 126a. In the third embodiment, an overlapping area between the common electrode (i.e., the second electrode 122) and the pixel electrode (i.e., the third electrode 126) is increased. When the overlapping area between the second electrode 122 and the third electrode 126 changes, the bias voltage needing to apply between the first electrode 116 and the second electrode 122 for achieving the same viewing angle varies. Typically, as the overlapping area between the second electrode 122 and the third electrode 126 decreases, the bias voltage needing to be applied between the first electrode 116 and the second electrode 122 is reduced for achieving the same viewing angle. However, when the overlapping area between the second electrode 122 and the third electrode 126 becomes smaller, the transmittance of the LCD 10 may be affected.

In the following, TechWiz software is used to simulate the viewing angle and the display effect of the LCD 10.

Figure 9:
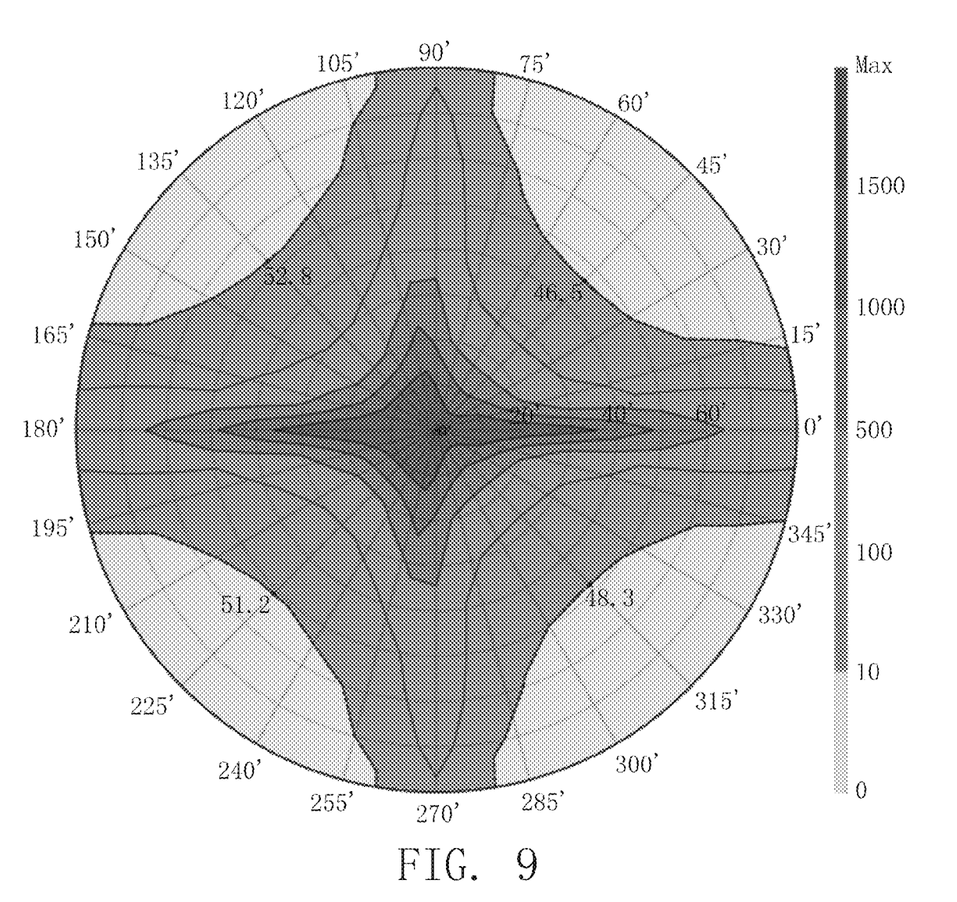
FIG. 9 shows the simulation result of viewing angle of the LCD with the pixel structure of FIG. 8 when displayed in a wide viewing angle display mode.

FIG. 9 shows the simulation result of viewing angle of the LCD with the pixel structure of FIG. 8 when displayed in a wide viewing angle display mode. In FIG. 9, no bias voltage is applied between the first electrode 116 and the second electrode 122. As can be seen from FIG. 9, the LCD 10 has a viewing angle from about −85° to about 85° both in the horizontal direction and in the vertical direction. Thus, the LCD 10 has a wide viewing angle which can meet the normal display requirements.

Figure 10A:
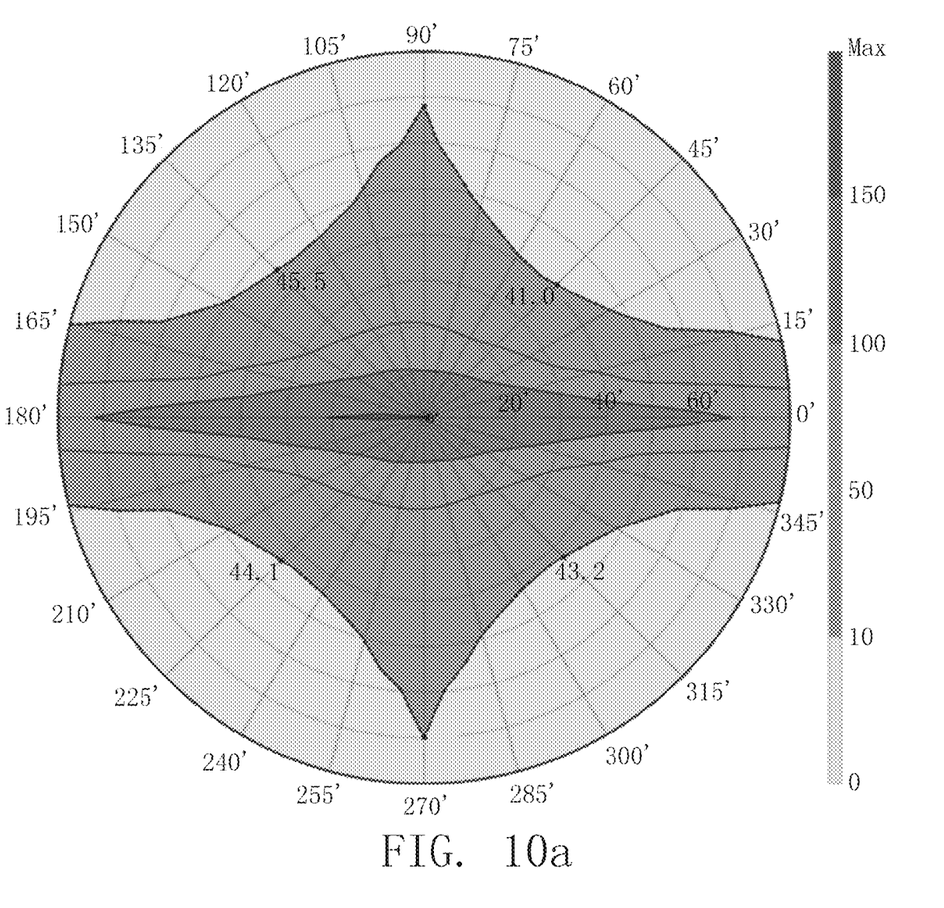
FIGS. 10a-10c show the simulation results of viewing angle of the LCD with the pixel structure of FIG. 8 when displayed in a narrow viewing angle display mode.
Figure 10B:
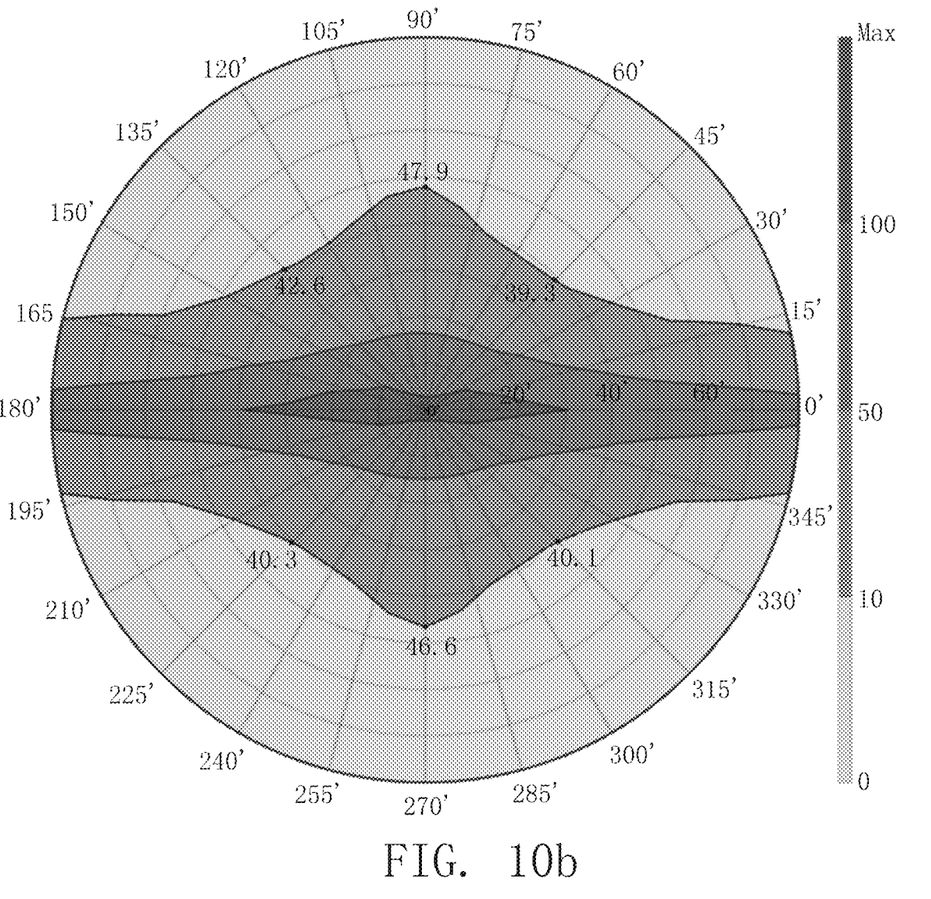
Figure 10C:
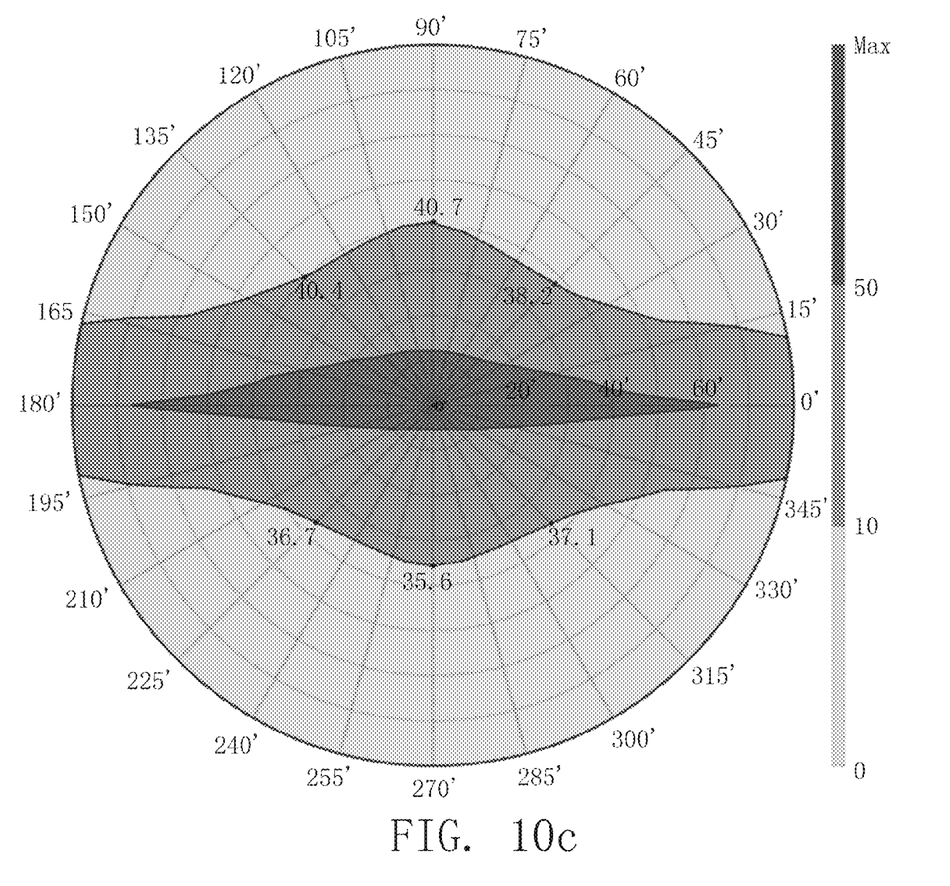

FIGS. 10a-10c show the simulation results of viewing angle of the LCD with the pixel structure of FIG. 8 when displayed in a narrow viewing angle display mode. In FIGS. 10a-10c, different bias voltages are applied between the first electrode 116 and the second electrode 122. A bias voltage of 4V is applied between the first electrode 116 and the second electrode 122 in FIG. 10a, a bias voltage of 5V is applied between the first electrode 116 and the second electrode 122 in FIG. 10b, and a bias voltage of 6V is applied between the first electrode 116 and the second electrode 122 in FIG. 10c. As can be seen from FIGS. 10a-10c, the viewing angle of the LCD 10 in the horizontal direction is gradually reduced as the bias voltage applied between the first electrode 116 and the second electrode 122 increases. For example, when the bias voltage applied between the first electrode 116 and the second electrode 122 reaches to 6V, the LCD 10 has a viewing angle of about 40° in the horizontal direction, which can basically meet the requirements for protecting privacy in public places.

Figure 11:
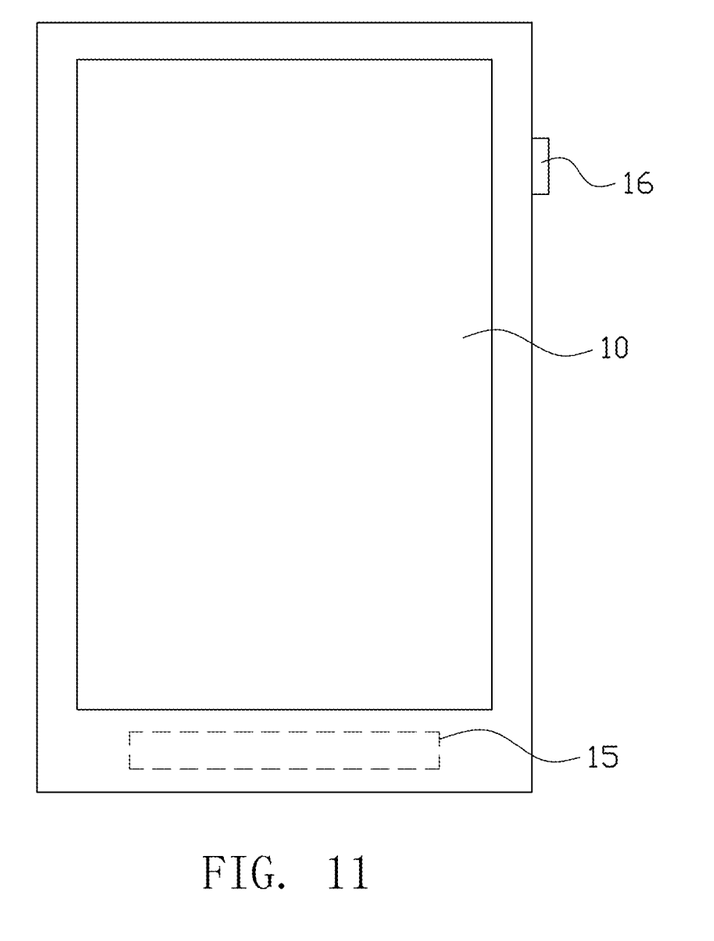
FIG. 11 schematically shows a plan view of an electronic device having the LCD according to an embodiment of the present application.

In another aspect, the present application provides an electronic device as schematically shown in FIG. 11. The electronic device includes an LCD 10 and a driver IC 15 electrically connected with the LCD 10 for driving the LCD 10. The LCD 10 is one of the LCDs as described above. The electronic device may be a notebook computer, a personal digital assistant (PDA), a tablet PC, a mobile phone, a digital camera, etc.

The bias voltage applied between the first electrode 116 and the second electrode 122 is provided to the LCD 10 by the driver IC 15. In order to switch the viewing angle of the LCD 10, the electronic device may be provided with a control button 16 for controlling the viewing angle of the LCD 10. For example, the LCD 10 can realize a wide viewing angle when the control button 16 is not pressed, in which case no bias voltage is applied between the first electrode 116 and the second electrode 122 by the driver IC 15, and the LCD 10 can realize a narrow viewing angle when the control button 16 is pressed, in which case a bias voltage with a predetermined value (e.g., 4V~7V) is applied between the first electrode 116 and the second electrode 122 by the driver IC 15. It should be noted that, the control button 16 can be a physical button formed on the electronic device or a virtual button with its function being executed by firmware or software.

In a further aspect, a method of controlling the viewing angle of the LCD 10 is provided. The method includes the steps: when the LCD 10 is required to display with a wide viewing angle, applying no bias voltage between the first electrode 116 and the second electrode 122; and when the LCD 10 is required to display with a narrow viewing angle, applying a bias voltage between the first electrode 116 and the second electrode 122. Preferably, in the narrow viewing angle, the bias voltage applied between the first electrode 116 and the second electrode 122 is in the range of 4V to 7V.

From the above, the first substrate 11 is provided with a first electrode 116, and the second substrate 12 is provided a second electrode 122 which acts as the common electrode and a third electrode 126 which acts as the pixel electrode. The first electrode 116 is provided with a plurality of first elongated electrodes 116a, and the second electrode 122 is provided with a plurality of second elongated electrodes 122b. The first elongated electrodes 116b and the second elongated electrodes 122b are arranged alternately, and the first elongated electrodes 116b have no overlap with the second elongated electrodes 122b. When no bias voltage is applied between the first electrode 116 and the second electrode 122, the LCD 10 achieves a wide viewing angle display mode as current FFS type LCDs or IPS type LCDs. When a bias voltage is applied between the first electrode 116 and the second electrode 122, an inclined electric field E is generated between the first elongated electrodes 116a and the second elongated electrodes 122a. The liquid crystal molecules 131 in the liquid crystal layer 13 rotate under the inclined electric field E to result a light leakage phenomenon, such that the contrast of brightness of the LCD 10 between the bright state and the dark state is decreased, and the viewing angle of the LCD 10 is reduced, to thereby achieve a narrow viewing angle display mode.

Therefore, by simply applying a bias voltage between the first electrode 116 and the second electrode 122, the viewing angle of the LCD 10 can be controlled. Thus, the LCD 10 can switch between a wide viewing angle display mode and a narrow viewing angle display mode to meet the requirements for protecting privacy in public places. It is not required to use a louver shielding film or to provide a dual light source backlight system in the LCD, without increasing the thickness and the cost of the LCD, and having the advantages of easy operation and good flexibility.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An LCD (liquid crystal display) with switchable viewing angle, comprising:
   a first substrate being provided with a first electrode, wherein the first electrode is provided with a plurality of first elongated electrodes;
   a second substrate being provided with a second electrode and a third electrode, wherein the second electrode is a common electrode for inputting a common voltage to the LCD, the third electrode is a pixel electrode formed in the sub-pixel areas of the LCD, the second electrode is provided with a plurality of second elongated electrodes, the first elongated electrodes and the second elongated electrodes are arranged alternately, and the first elongated electrodes have no overlap with the second elongated electrodes; and
   a liquid crystal layer being sealed between the first substrate and the second substrate, wherein the liquid crystal layer is provided with a plurality of negative liquid crystal molecules;
   wherein when no bias voltage is applied between the first electrode and the second electrode, the LCD is displayed with a wide viewing angle; and when a bias voltage is applied between the first electrode and the second electrode to generate an inclined electric field between the first elongated electrodes and the second elongated electrodes, the LCD is displayed with a narrow viewing angle.

2. The LCD of claim 1, wherein the LCD further comprises a plurality of scanning lines and a plurality of data lines, the sub-pixels areas are defined by the scanning lines and the data lines intersecting with each other, a sub-pixel is formed in each sub-pixel area, and the sub-pixels are arranged in rows and columns.

3. The LCD of claim 2, wherein the second elongated electrodes are formed at a central portion of each sub-pixel area, and the first elongated electrodes are formed at two opposite sides of each second elongated electrode.

4. The LCD of claim 2, wherein the first electrode is further provided with a first connecting line, and the first elongated electrodes extend perpendicularly from the first connecting line.

5. The LCD of claim 4, wherein the second electrode is further provided with a second connecting line, and the second elongated electrodes extend perpendicularly from the second connecting line.

6. The LCD of claim 5, wherein each sub-pixel has a length direction along the data lines, the first connecting line and the second connecting line extend along the direction of the scanning lines, the first connecting line and the second connecting line are located respectively at lower and upper sides of each row of sub-pixels.

7. The LCD of claim 6, wherein the first elongated electrodes and the second elongated electrodes extend along the direction of the data lines.

8. The LCD of claim 5, wherein each sub-pixel has a length direction along the scanning lines, the first connecting line and the second connecting line extend along the direction of the data lines, the first connecting line and the second connecting line are located respectively at left and right sides of each column of sub-pixels.

9. The LCD of claim 8, wherein the first elongated electrodes and the second elongated electrodes extend along the direction of the scanning lines.

10. The LCD of claim 2, wherein a first elongated gap is formed between every two neighboring first elongated electrodes, and the second elongated electrodes are disposed corresponding to the first elongated gaps.

11. The LCD of claim 10, wherein a second elongated gap is formed between every two neighboring second elongated electrodes, and the first elongated electrodes are disposed corresponding to the second elongated gaps.

12. The LCD of claim 2, wherein the third electrode in each sub-pixel area includes a plurality of third elongated electrodes.

13. The LCD of claim 12, wherein a portion of the third elongated electrodes are overlapped with the second elongated electrode, another portion of the third elongated electrodes are overlapped with the first elongated electrodes.

14. The LCD of claim 2, wherein the first substrate is a color filter substrate, the second substrate is a thin film transistor array substrate.

15. An electronic device, comprising:
    the LCD of claim 1; and
    a driver IC electrically connected with the LCD for driving the LCD.

16. The electronic device of claim 15, wherein the electronic device is provided with a control button for controlling the viewing angle of the LCD.

17. A method of controlling the viewing angle of the LCD of claim 1, comprising the steps:
    when the LCD is required to display with a wide viewing angle, applying no bias voltage between the first electrode and the second electrode;
    when the LCD is required to display with a narrow viewing angle, applying a bias voltage between the first electrode and the second electrode.

18. The method of claim 17, wherein the bias voltage applied between the first electrode and the second electrode is in the range of 4V to 7V.

* * * * *